United States Patent [19]

Hirota et al.

[11] Patent Number: 5,041,915
[45] Date of Patent: Aug. 20, 1991

[54] FACSIMILE APPARATUS WITH CONTROLLABLE PIXEL DENSITY FOR IMAGE FORMATION

[75] Inventors: Yuko Hirota, Tokyo; Shintaro Abe, Fujisawa, both of Japan

[73] Assignee: Canon Kabushiki Kaisha, Tokyo, Japan

[21] Appl. No.: 640,519

[22] Filed: Jan. 11, 1991

Related U.S. Application Data

[63] Continuation of Ser. No. 347,919, May 5, 1989, abandoned.

[30] Foreign Application Priority Data

May 10, 1988 [JP] Japan .................. 63-111646
May 17, 1988 [JP] Japan .................. 63-118271

[51] Int. Cl.$^5$ ........................................... H04N 1/00
[52] U.S. Cl. ..................... 358/400; 358/407; 358/434; 358/435; 358/438
[58] Field of Search ............... 358/400, 401, 405, 407, 358/434, 435, 436, 437, 438, 439, 442, 445

[56] References Cited

U.S. PATENT DOCUMENTS 4,746,986 5/1988 Tanigawa .................. 358/256
4,876,604 10/1989 Nobuta .................. 358/400
4,974,097 11/1990 Kaneko et al. .................. 358/401

FOREIGN PATENT DOCUMENTS 0184868 10/1983 Japan .
63-133753 6/1988 Japan .

Primary Examiner—Edward L. Coles, Sr.
Assistant Examiner—Jerome Grant, II.
Attorney, Agent, or Firm—Fitzpatrick, Cella, Harper & Scinto

[57] ABSTRACT

A facsimile apparatus in which the pixel density of image data being received or transmitted can be converted when the image being received or to be transmitted is formed. The apparatus photoelectrically reads a document image at a fixed pixel density and can be manually instructed to execute or not to execute a conversion process on the pixel density of the read image data. If instructed to execute the conversion process the image data whose pixel density has been converted is encoded and transmitted, and if instructed not to execute the conversion process the non-converted image data is transmitted.

13 Claims, 13 Drawing Sheets

FACSIMILE APPARATUS WITH CONTROLLABLE PIXEL DENSITY FOR IMAGE FORMATION

This application is a continuation of application Ser. No. 07/347,919 filed May 5, 1989, now abandoned.

BACKGROUND OF THE INVENTION

1. Field of the Invention

The present invention relates to a facsimile apparatus which is capable of transmission and reception of image signals in at least two communication standard modes, and more particularly, it concerns a facsimile apparatus which is capable of transmitting/receiving and printing image signals having a pixel density conforming to either the G3 or G4 standard.

2. Description of Related Art

Recently, the standardization of facsimile apparatuses has been promoted under the recommendation of the CCITT. There are four standards, i.e., Groups 1 to 4 (hereinafter referred to as G1 to G4), at present. Each standard employs its own protocol and coding scheme which is different from the others. G1, G2 and G3 facsimile machines are analog machines mainly used for communication over a public telecommunication network, while a G4 facsimile machine is a digital machine used for communication over a digital communication network. Accordingly, communication images are processed in different ways in analog and digital machines: in a G3 facsimile machine, image signals are in general MH (modified Huffman) coded, while a G4 facsimile machine employs the MMR (modified MR) coding scheme as the standard coding scheme. Further, the pixel density of communication images in analog and digital machines is different: in a G3 facsimile machine, the pixel density is represented by a metric system of units, like 8 dots/mm in the horizontal direction and 3.8 dots/mm in the vertical direction, while in a G4 facsimile apparatus the pixel density is represented by an inch system of units, like 200 to 400 dots/inch in both the vertical and horizontal directions.

Currently, the mainstream of facsimile communication takes place in the G3 standard which employs analog lines (public telecommunication lines) for communication. However, the growing increase in the amount of information being communicated has accelerated the adoption of G4 facsimile machines that employ digital communication lines. This transition from G3 facsimile machines to G4 facsimile machines necessitates the use of facsimile machine which meet both G3 and G4 standards.

FIG. 10 is a block diagram of such a facsimile apparatus which meets both the G3 and G4 standards. In this facsimile apparatus, a subject document or the like is read optically and is converted to an electrical signal by an image reader 50. The pixel density of the image signal read is converted by a pixel density converter 51, and the resultant image signal is sent to an encoder 52 where it is compressed. The compressed image data is stored in an image memory 53. When the data is to be transmitted to a G4 facsimile machine, the image data from the image memory 53 is MMR coded by an encode/decode unit 54, and the coded data is sent out on a communication line 61 by a G4 communication control unit 55. For communication to a G3 machine, the image data from the image memory 53 is MH coded by an encode/decode unit 56, and the converted MH codes are sent out on a communication line 62 by a G3 communication control unit 57.

Conversely, the G4 standard image data received by the communication control unit 55 is decoded by the encode/decode unit 54, the decoded data being stored in the image memory 53. The G3 standard image data received by the G3 communication control unit 57 is decoded by the encode/decode unit 56, and the decoded data is stored in the image memory 53. The image data from the image memory 53 is decoded by a decoder 58 for the purpose of expanding the image data. The pixel density of the decoded image data is converted by a pixel density converter 59, and the resultant image data is recorded by an image recorder 60 such as a thermal printer.

However, the pixel density of the G3 standard image data is different from that of the G4 standard image data. It is now assumed that the pixel density of both the image reader 50 and the image recorder 60 is fixed at, for example, 200 dots/inch in both the vertical and horizontal directions. In a case where image data with a pixel density of 200 dots/inch is received by the G4 communication control unit 55, the image reproduced by the recorder 60 corresponds to the original document because the pixel density of the received image data is the same as that at which the image data was recorded by the image recorder 60. However, in a case where G3 standard image data is received from the analog line, the image reproduced by the image recorder 60 is reduced or enlarged relative to the original document in the vertical and horizontal directions. More specifically, image data in the inch system (G4 standard, with a pixel density of $200 \times 200$ dots/inch$^2$) corresponds to image data in the metric system (G3 standard) having a pixel density of $8 \times 7.7$ dots/mm$^2$. However, $200 \times 200$ dots/inch$^2$ is equivalent to about $7.87 \times 7.87$ dots/mm$^2$. In consequence, the image in the metric system reproduced by the image recorder 60 is reduced in the longitudinal direction and is enlarged in the lateral direction.

FIG. 11A shows an image of an original 65 read according to the inch system (the G4 machine) and reproduced according to the metric system (the G3 machine). In this case, reproduction 66 of the original 65 is reduced in the lateral direction and is enlarged in the longitudinal direction. Accordingly, conversion of the pixel density is conducted by the pixel density converter 51 and 59 for the purpose of eliminating this problem. For example, when data of $8 \times 7.7$ dots/mm$^2$ conforming to the G3 standard is converted to $200 \times 200$ dots/inch$^2$ data conforming to the G4 standard, one dot is deleted per 64 dots in the horizontal direction, and one row, having the same pixel values as those in the previous row, is added per 45 rows of pixels in the vertical direction.

This arrangement allows a reproduced image to be of the same size as that of the original document. However, deletion or interpolation of pixel data which are processed during the conversion of the pixel density deteriorates the quality of the image. This process is illustrated in FIG. 11B. A document 67 reproduced by the image recorder 60 at a converted pixel density has the same size as that of the original document 65 but its quality is degraded.

SUMMARY OF THE INVENTION

In view of the aforementioned problem of the related art, an object of the present invention is to provide a facsimile apparatus which is capable of recording an image received from a communication network by a recording unit at a pixel density thereof which is converted so that it corresponds to that of the received image when the pixel density of the received image differs from that of the recording unit.

Another object of the present invention is to provide a facsimile apparatus which is capable of transmitting image data at a pixel density which is converted so that it corresponds to that of the facsimile apparatus of the receiving party.

Another object of the present invention is to provide a facsimile apparatus which is capable of printing the image data received in the G3 standard mode at a pixel density conforming to the G3 standard and the image data received in the G4 standard mode at a pixel density conforming to the G4 standard.

Another object of the present invention is to provide a facsimile apparatus which is capable of transmitting the image data having a pixel density conforming to the G3 standard when the facsimile apparatus of the receiving party is a G3 machine and the image data having a pixel density conforming to the G4 standard when the facsimile apparatus of the receiving party is a G4 machine.

To achieve the above-described objects of the present invention, the present invention provides a facsimile apparatus which is capable of transmitting and receiving data in at least two selected communication standard modes. The facsimile apparatus comprises: receiving means provided in conformance to the communication receiver standards; determination means for determining the communication standard of the image signal received by the receiving means; decoding means for decoding the image signal received in accordance with the results of determination made by the determination means; recording means capable of recording the decoded image data at a modified recording density; recording density converting means for converting the recording density of the recording means in accordance with the results of determination made by the determination means; instruction means for providing an instruction as to the communication standard of the receiving facsimile apparatus; image reading means in which the pixel density with which an original document is read can be modified; control means for controlling the image reading means such that it modifies the pixel density in accordance with the instruction from the instruction means; encoding means for encoding the image signal from the image reading means in accordance with the instruction from the instruction means; and transmission means for transmitting the encoded image signal in conformity with the communication standard of the receiving facsimile apparatus.

As stated above, adoption of an image recording unit which is capable of recording data at a converted pixel density increases the costs of production. Further, the printers incorporated in facsimile machines are generally of the type in which the pixel density is fixed. Accordingly, conversion of the pixel density of the image data to be output to the image recording unit by means of software or the like can be considered. However, conversion of the pixel density always causes deterioration of the quality of the image. This means that even an image of a type in which maintenance of the quality of the image should be given priority over the exact duplication of the size of the original image is treated in the same manner as other types of image, i.e., the size of the received image is made identical with that of the original document, causing a deterioration in the quality of the image.

Accordingly, another object of the present invention is to provide a facsimile apparatus in which the options of executing or not executing conversion of the pixel density of image data can be selected depending on whether maintenance of the quality of the image should be given priority over the exact duplication of the size of the original image, or whether maintenance of the size of the image should be given priority over maintenance of the quality of the image.

Another object of the present invention is to provide a facsimile apparatus incorporating a recording unit which is capable of recording image data at a pixel density conforming to the G3 or G4 standard in which execution and non-execution of the conversion of the pixel density of the image data to be printed out by the recording unit can be selected when the image data having a pixel density conforming to the other standard is received by the facsimile apparatus.

Another object of the present invention is to provide a facsimile apparatus incorporating a data reading unit which is capable of reading image data at a pixel density conforming to the G3 or G4 standard in which execution and non-execution of the conversion of the pixel density of the image data to be transmitted can be selected when the facsimile apparatus is transmitting image data to a facsimile apparatus that conforms to the other standard.

The above-described objects of the present invention can be achieved by the provision of a facsimile apparatus in which the pixel density of image data received or to be transmitted can be converted when the image received or to be transmitted is to be formed. The facsimile apparatus comprises: reading means for photoelectrically reading a document image at a fixed pixel density; first converting means for converting the pixel density of the image data from the reading means; transmission means for encoding and transmitting the image data whose pixel density has been converted by the first conversion means or the image data whose pixel density has not been converted; receiving means for receiving a facsimile image signal; decoding means for decoding the image signal received by the receiving means and thereby converting it into image data; recording means for recording the image data at a fixed pixel density; second converting means for converting the pixel density of the image data so that it conforms to the pixel density of the recording means; and instruction means for instructing both the first and the second converting means to execute or not to execute conversion of the pixel density.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Embodiments of the present invention will be described below in detail with reference to the accompanying drawings.

Figure 1:
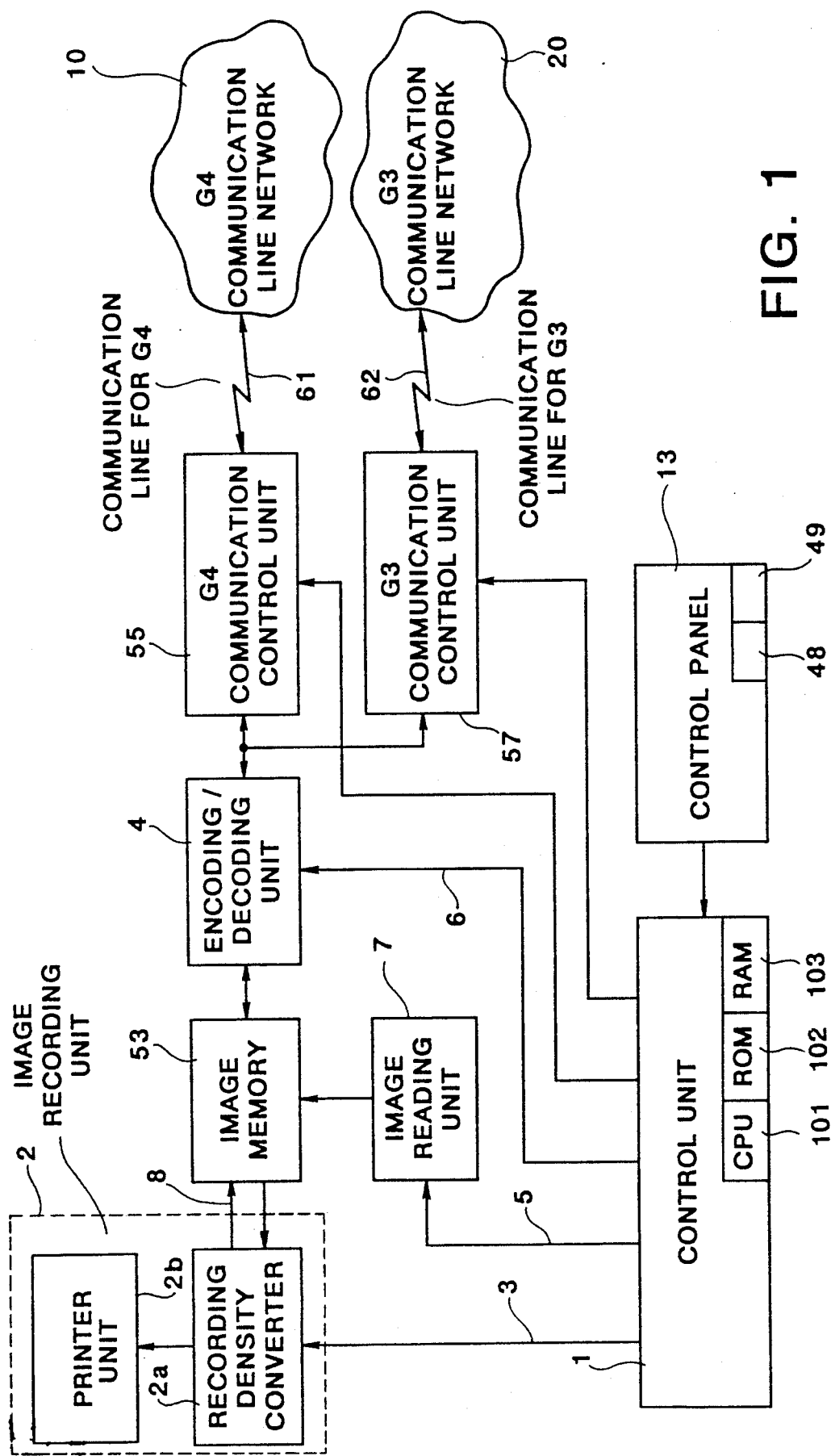
FIG. 1 is a block diagram of a facsimile apparatus, showing a first embodiment of the present invention.

First, a first embodiment of the present invention will be described with reference to FIG. 1. In FIG. 1, the same reference numerals are used to denote parts which are the same as those of the conventional facsimile apparatus of FIG. 10.

A control unit 1 for controlling the overall facsimile machine incorporates a ROM 102 for storing programs on the basis of which the control unit 1 outputs various types of control signal, a CPU 101 for controlling the various units and executing various operations, and a RAM 103 used as the work area for the CPU 101 to temporarily store various types of data. The image data output from an image memory 53 is printed out by an image recording unit 2 at a recording density corresponding to a density control signal 3 sent from the control unit 1. The image data received from a communication network or read by an image reading unit 7 is stored in an image memory 53. An encoding/decoding unit 4 is capable of encoding and decoding image data in a known encoding/decoding process in accordance with a control signal 6 sent from the control unit 1. The encoding/decoding unit 4 has the same functions as those of the encode/decode units 54 and 56 shown in FIG. 10. When the control signal 6 sent from the control unit 1 instructs transmission/receipt of data in the G3 standard mode, the encoding/decoding unit 4 encodes/decodes data in the G3 standard mode. When the transmission/receipt of data in the G4 standard mode is instructed by the control unit 1, the encoding/decoding unit 4 performs encoding/decoding in conformity with the G4 standard. A control panel 13 incorporates a dialing key (not shown), a transmission start key 48, an instruction key 49 with which the transmission mode is designated be either G3 or G4, mode and so on.

Figure 10:
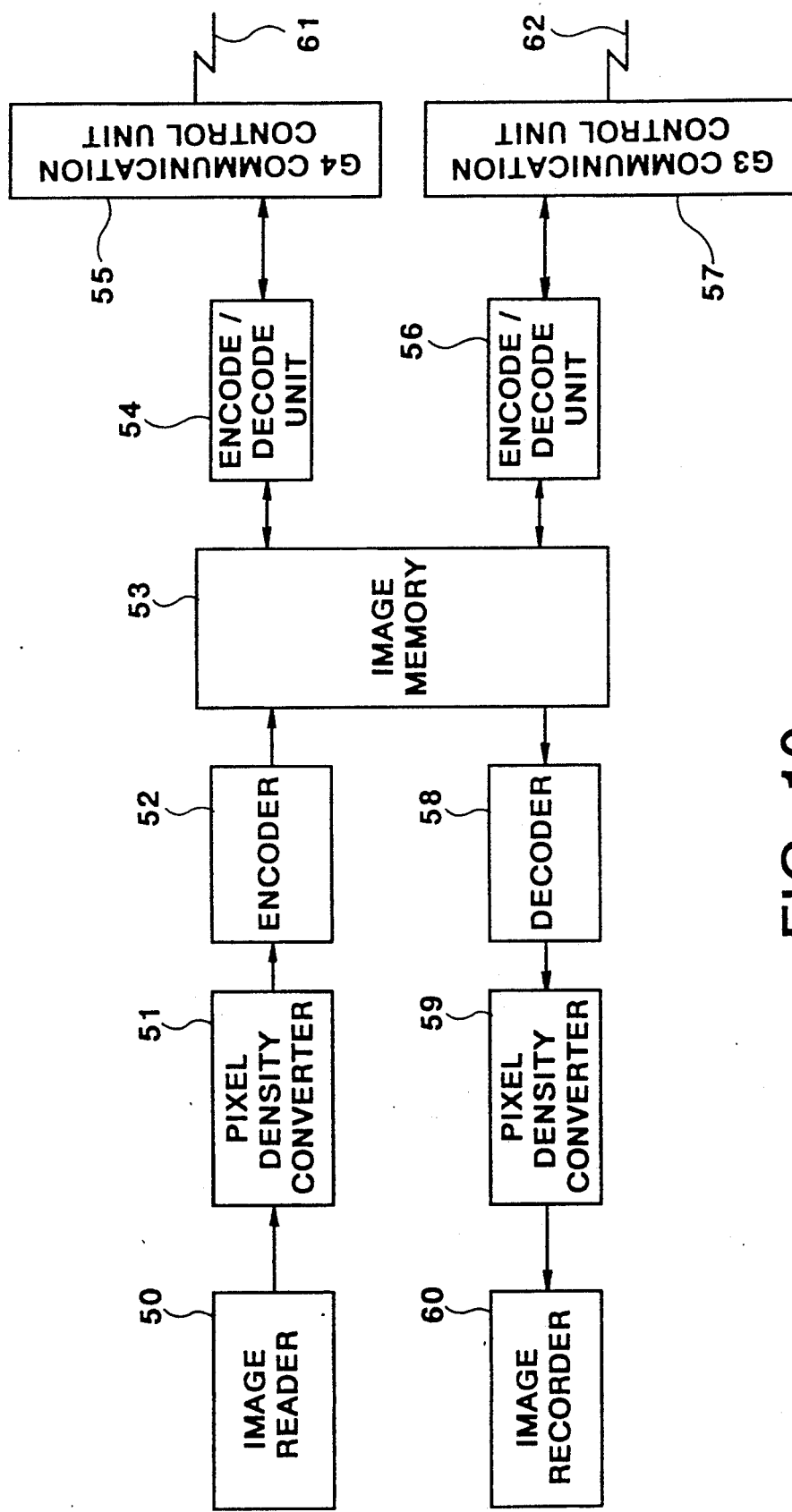
FIG. 10 is a block diagram of a conventional facsimile apparatus.
Figure 11A:
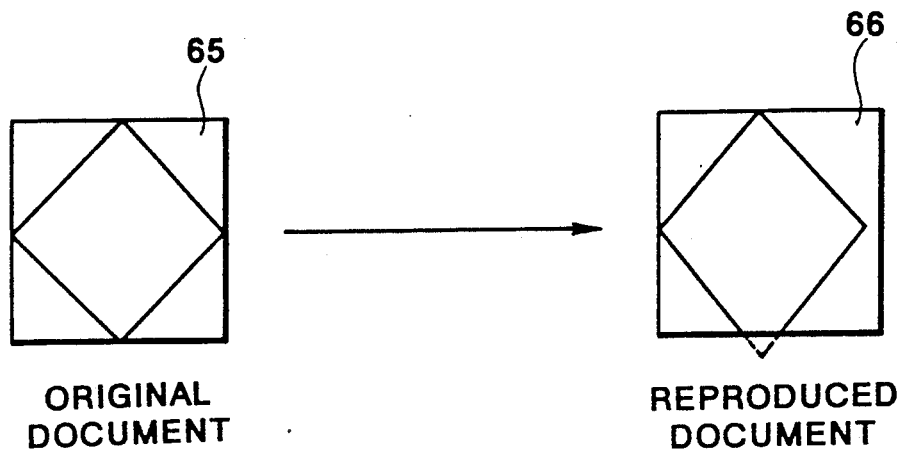
FIG. 11A illustrates an original document and a reproduced document output without converting the pixel density of the original document.
Figure 11B:
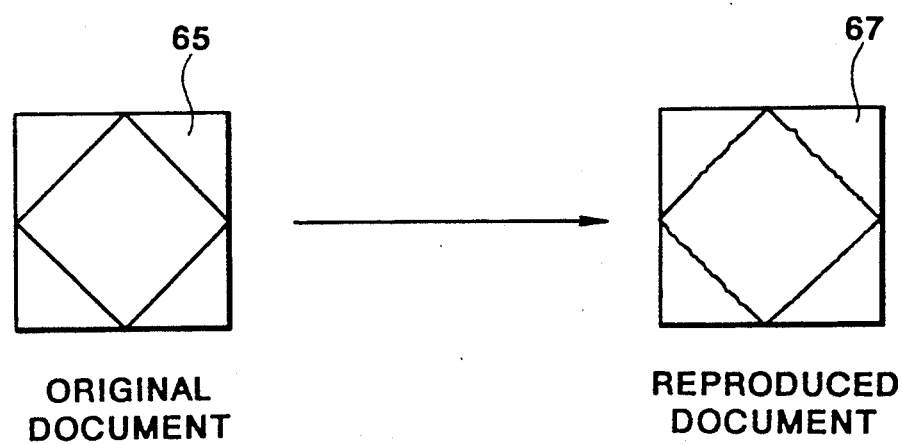
FIG. 11B illustrates an original document and a reproduced document whose pixel density has been converted.

A G3 communication control unit 57 is connected to a G3 telecommunication network 20. It performs facsimile communication in conformity with the known G3 communication standard. A G4 communication control unit 55, which is connected to a G4 telecommunication network 10, performs facsimile communication conforming to the known G4 communication standard. An image of an original document is read by an image reading unit 7 at a pixel density corresponding to a density control signal 5 sent from the control unit 1. The image data read by the image reading unit 7 is temporarily stored in the image memory 53, and is then sent out to the telecommunication network 10 or 20 or is printed out by the image recording unit 2. As is shown in FIG. 10, an encoder and a decoder may be respectively provided between the image reading unit 7 and the image memory 53 and between the image memory 53 and the image recording unit 2 so as to allow the capacity of the image memory 53 to be reduced. A ROM 102 stores parameters used in this embodiment, in addition to the above-described programs.

Conversion of the recording density performed by a recording density converter 2a of the image recording unit 2 will be described below in detail with reference to FIG. 2A. It is to be noted that the present embodiment employs as the image recording unit 2 a laser beam printer in which an image is formed by the electrophotographic recording process.

Figure 2A:
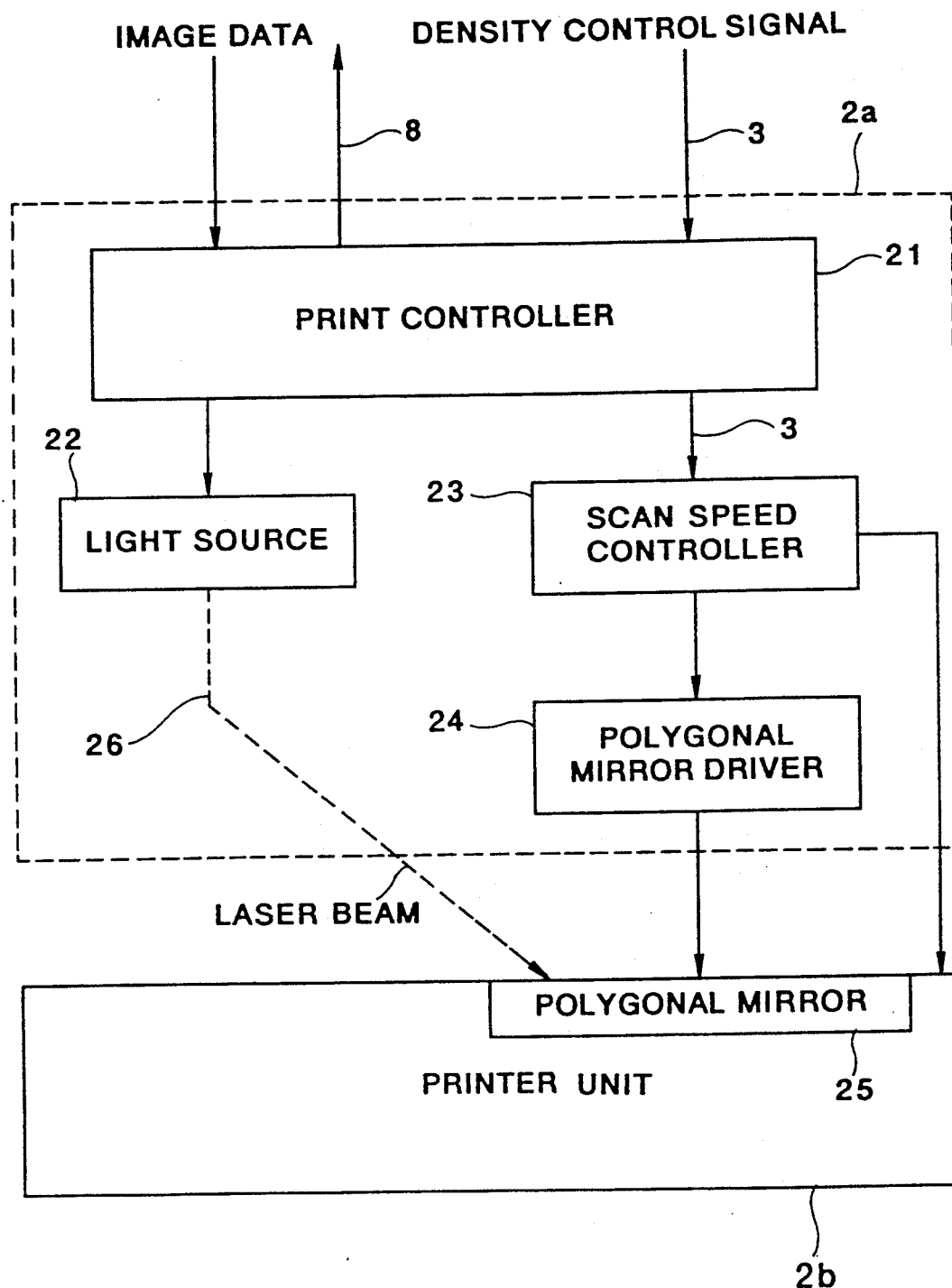
FIG. 2A is a block diagram of a recording density converter of FIG. 1.

In the image recording unit 2 shown in FIG. 2A, a print controller 21 receives a density control signal 3 from the control unit 1, and outputs reading signals 8 to the image memory 53 at a timing corresponding to the designated recording density so as to read out the image data stored in the image memory 53. A light emitting source 22 emits a laser beam 26 in response to the image data from the print controller 21. A scan speed controller 23 decides the rotational speed of a polygonal mirror 25 in accordance with the recording density designated by the print controller 21 (which is the density control signal 3), and controls a polygonal mirror driver 24 and, hence, the rotational speed of the polygonal mirror 25 on the basis of the decided rotational speed. The scanning speed of the beam in a printer unit 2b that scans a photosensitive body is controlled by the control of the rotational speed of the polygonal mirror 25. A polygonal mirror driver 24 rotates a motor for rotating the polygonal mirror 25 at a speed designated by the scan speed controller 23. The printer unit 2b incorporates the known latent image forming mechanism, latent image developing mechanism and developed image fixing mechanism according to the electrophotographic recording process, description thereof not detailed, as unnecessary.

Figure 2B:
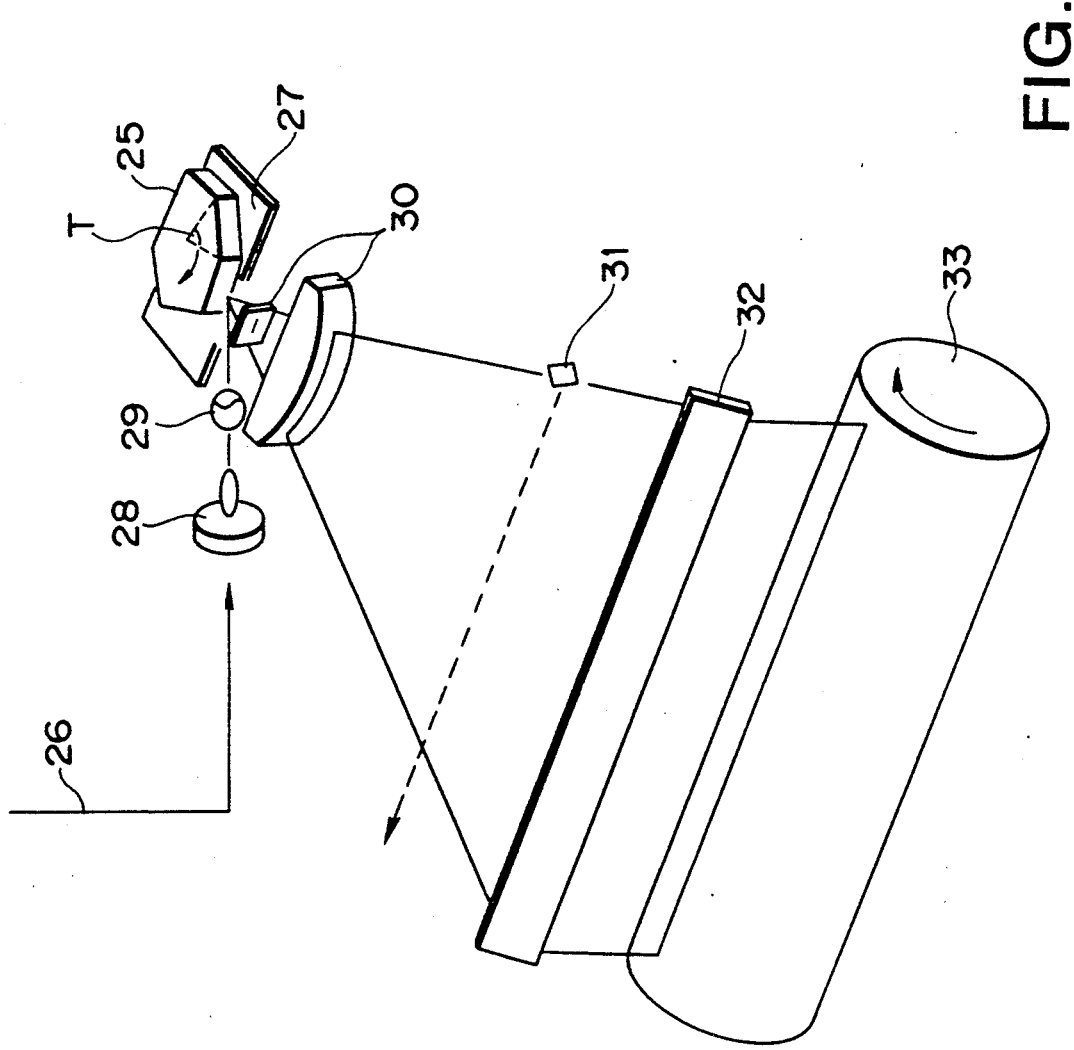
FIG. 2B is a schematic view of a printer unit of the facsimile apparatus of FIG. 1.

FIG. 2B is a schematic view of the printer unit 2b. The modulated laser beam 26 is converted to a beam made up of parallel rays of light by a collimator lens 28 and a cylindrical lens 29, and is then made incident on the polygonal mirror 25 rotated by a motor 27. The laser beam reflected by the polygonal mirror 25 is focused on a photosensitive drum 33 by image forming lenses 30. A reference numeral 31 denotes a beam detector, and a reference numeral 32 designates a reflecting mirror. Assuming that the rotational speed of the photosensitive drum 33 is substantially fixed, the vertical and horizontal resolutions in a printer that uses the electrophotographic recording process are generally obtained by the following equations:

Number of Vertical Scanning line $Nv = (S/T)$

Number of Horizontal Dots $Nh = (T/t)$ where S is the time required to print one page, T is the time required for the polygonal mirror 25 to be rotated through a rotational angle corresponding to one surface thereof (one scanning period of the laser beam) and t is the period of the image data signal from the print controller 21.

It will be seen from the above-described equations that the resolution of a recorded image can be changed by varying T and t. Change in the rotational speed of the polygonal mirror 25 causes the dot intervals to change uniformly, diminishing the deterioration in the quality of printed image.

Hence, when the data received from the G3 telecommunication network 20 is to be printed out, the time required for the polygonal mirror 25 to be rotated through a rotational angle corresponding to one surface thereof is determined on the basis of the rotational speed of the photosensitive drum 33, and the recording density converter 2a is controlled in accordance with the determined rotational speed and so on. Similarly, when the data is received from the G4 telecommunication network 10 is to be printed out, the time required for the polygonal mirror 25 to be rotated through a rotational angle corresponding to one surface thereof is determined on the basis of the rotational speed of the photosensitive drum 33, and the recording density converter 2a is controlled in accordance with the determined rotational speed.

In the above-described description, an image recording unit 2 which is a printer that uses the electrophotographic recording process is exemplified. However, other types of printer may also be used. For example, in the case of a serial printer in which printing is performed in the form of a dot matrix, the recording density in the horizontal direction (in the direction of the rotation of a drum) can be changed by varying the speed at which a carriage with a recording head is moved while fixing the period of the image data output to the recording head. The recording density in the horizontal direction may also be changed by changing the period of the image data output to the recording head while fixing the speed of the movement of the carriage. Further, the recording density in the vertical direction (in the direction perpendicular to the direction in which the drum is rotated) can be changed by changing the stepping distance at which a motor for conveying recording paper is driven per line.

Figure 3:
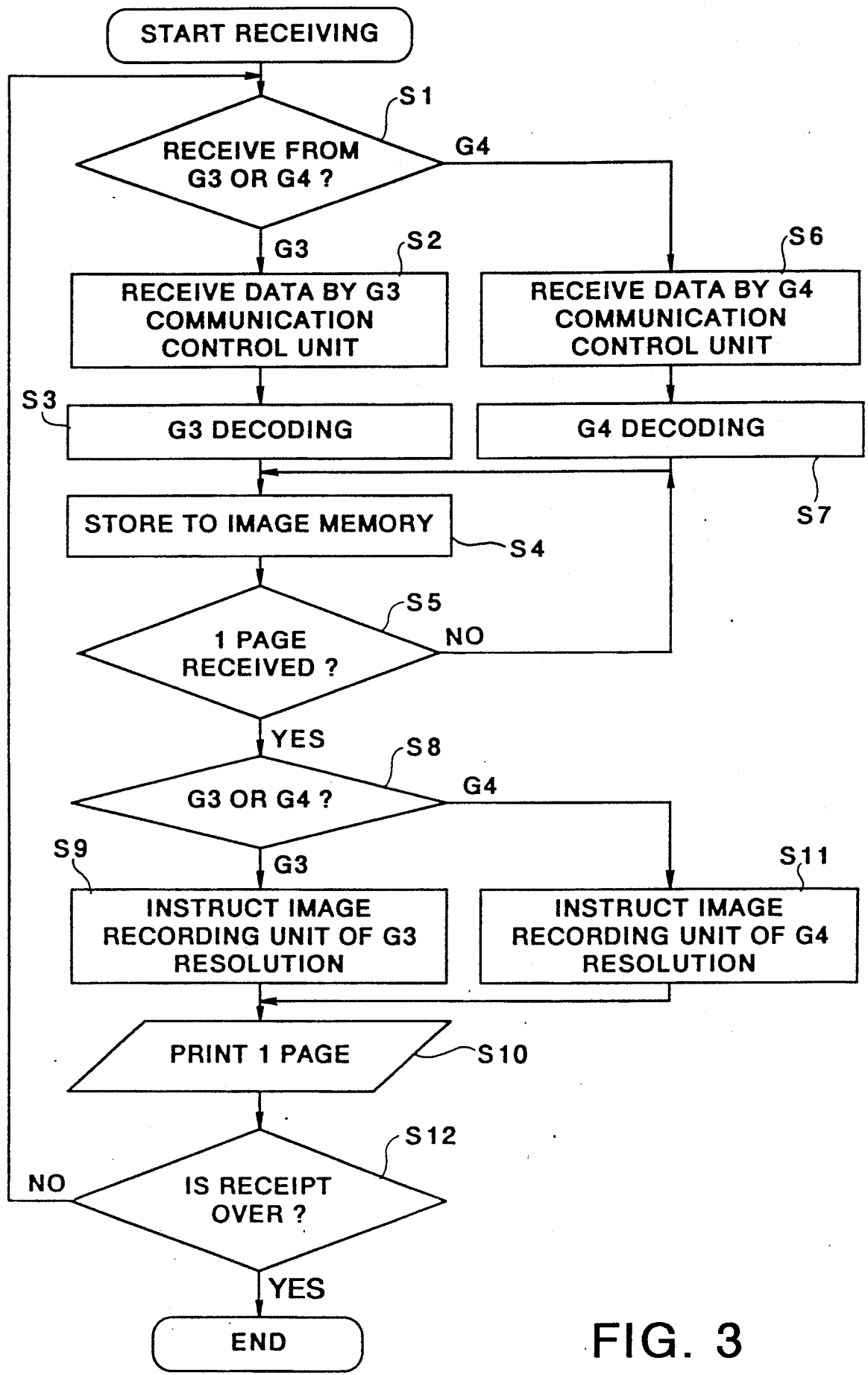
FIG. 3 is a flowchart of the receipt control routine process by the facsimile apparatus of FIG. 1.

Receipt control performed in the control unit 1 of the above-described facsimile apparatus will now be described with reference to the flowchart of FIG. 3. The control program used to execute this processing is stored in the ROM 102.

A call arriving at the G3 communication control unit 57 or the G4 communication control unit 55 from the telecommunication network 10 or 20 is informed by the corresponding communication control unit 55 or 57 to the control unit 1. When the control unit 1 detects the arrival of the call, it starts the processing shown in FIG. 3 and determines in step S1 whether it is the G3 communication control unit 57 or the G4 communication control unit 55 that detected the call. If the call is detected by the G3 communication control unit 57, the G3 communication control unit 57 is activated by the control unit 1 in step S3 to receive the data from the G3 telecommunication network 20. Concurrently with this, the control unit 1 gives the encoding/decoding unit 4 an instruction in step S3 to decode the received coded data in the G3 decoding mode. Subsequently, in step S4, the decoded data is stored at a predetermined address in the image memory 53. In step S5, it is then determined whether or not data corresponding to one page has been received. If data corresponding to one page has not yet been received, the processing returns to step S4, and receipt of data continues. Thereafter, the data arriving from the G3 telecommunication network 20 is sequentially received by the G3 communication control unit 57, the received data being decoded (expanded) by the encoding/decoding unit 4 and the decoded data being stored in the image memory 53.

On the other hand, if it is determined in step S1 that the call was detected by the G4 communication control unit 55, the processing goes to step S6, where the G4 communication control unit 55 is activated to receive the data from the G4 telecommunication network 10. Concurrently with this, the control unit 1 gives the encoding/decoding unit 4 an instruction in step S7 to decode the received data in the G4 decoding mode. The processing then proceeds to step S4. Thus, the data arriving from the G4 telecommunication network 10 is received by the G4 communication control unit 55, the received data is decoded (expanded) by the encoding/decoding unit 4, and the decoded data is stored in the image memory 53. Thereafter, it is determined in step S5 whether or not data corresponding to one page has been received. If data corresponding to one page has not yet been received, the processing returns to step S4. If the answer is yes in step S5, the processing proceeds to step S8.

In step S8, it is determined whether the data stored in the image memory 53 arrived from the G3 telecommunication network 20 or the G4 telecommunication network 10. If the data is received from the G3 telecommunication network 20, the control unit 1 gives the image recording unit 2 an instruction by means of the density control signal 3 in step S9 to print out the image data stored in the image memory 53 at a resolution conforming to the G3 standard (at a recording density for G3). Thereafter, the processing goes to step S10.

On the other hand, if the image memory 53 stores data received from the G4 telecommunication network 10, the control unit 1 gives the image recording unit 2 an instruction by means of the density control signal 3 in step S10 to print out the image data stored in the image memory 53 at a resolution conforming to the G4 standard (at a recording density for G4).

In that case, the recording dot density for printing in the G3 and G4 standard modes is, for example, $8 \times 3.85$ dots/mm$^2$ and $8 \times 7.7$ dots/mm$^2$, respectively. In addition, the dot density for the printing in the G4 standard mode ranges between 200 dots/inch and 400 dots/inch. Accordingly, it may also be arranged such that the density control signal 3 (and 5) contains the dot density information on the image data and that printing is performed in the image recording unit 2 at a dot density corresponding to the dot density of the image data represented by the signals 3 and 5.

Upon receipt of the recording density control signal 3, the image recording unit 2 determines the rotational speed of the photosensitive body (the time required for one page to be printed out) in conformity with the designated standard in the above-described manner. The image recording unit 2 then determines the time required for the polygonal mirror 25 to be rotated through a rotational angle corresponding to one surface thereof on the basis of the determined rotational speed of the photosensitive body. The recording density converter 2a is controlled in accordance with the determined rotational speed and so on so as to print out data corresponding to one page.

Conventionally, printing out of the image data received in, for example, the G3 mode having a density of $8 \times 3.85$ dots/mm$^2$ with a the recording unit in which the data is printed out at a recording density of $8 \times 7.7$ dots/mm$^2$ requires a special reducing/enlarging unit. However, in this embodiment, the image data received in the G3 standard mode can be printed out by the recording unit 2 at a resolution conforming to that standard merely by controlling the operation speed at which the mechanisms in the image recording unit 2 print out data. Further, deterioration in the quality of a reproduced image does not occur. This also applies to the printing out of the image data received in the G4 mode having a density of $200 \times 200$ PPI (pixels per inch) by the recording unit in which data is printed out at a recording density of $400 \times 400$ PPI.

The above description explains a case in which the image data is stored in the image memory for each page and in which printing is conducted each time the image data corresponding to one page is prepared. However, printing may also be conducted each time an amount of data that can be printed out by the image recording unit 2 is stored.

Next, conversion of the dot density performed in the image reading unit 7 will be described.

Figure 4:
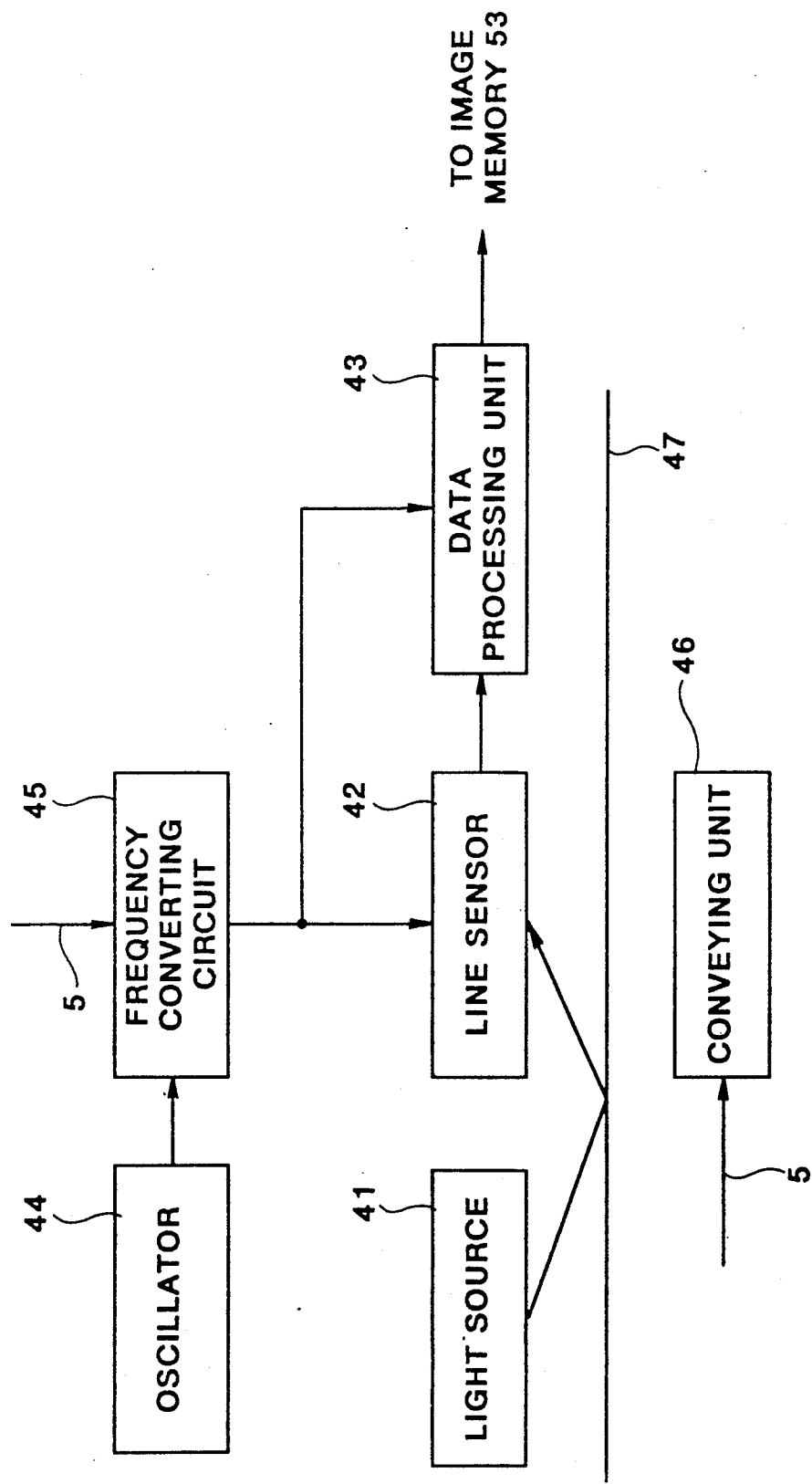
FIG. 4 is a block diagram of an image reading unit of the facsimile apparatus of FIG. 1.

FIG. 4 is a block diagram of the image reading unit 7 of this embodiment. An original document 47 is illuminated by light from a light source 41. The light illuminating the original document 47 is reflected by the original document 47, and the reflected light is made incident on a line sensor 42 which is, for example, a CCD. The analog image signal output from the line sensor 42 is converted to a digital signal by a data processing unit 43, the converted digital signal, together with a horizontal synchronizing signal and a vertical synchronizing signal, being output to the image memory 53 as an image signal corresponding to one line. A clock signal having a predetermined frequency is generated by an oscillator 44, and the generated clock signal is input to a frequency converting circuit 45 which divides the clock and outputs the divided clock to the line sensor 42 as a driving clock. The frequency of the driving clock for the line sensor 42 is varied in accordance with the density control signal 5 from the control unit 1 by the frequency converting unit 45. The original document 47 is conveyed by a conveying unit 46. The rotational speed of a conveying motor or the stepping angle thereof (in the case where the conveying motor is a stepping motor) is adjusted in accordance with the density control signal 5 from the control unit 1.

With the above-described arrangement, when the transmission of image on the G3 telecommunication network 20 is instructed by the density control signal 5 from the control unit 1, the dot density in the horizontal direction can be changed to a value conforming to the G3 standard by changing the frequency of the driving clock for the line sensor 42 with the frequency converting circuit 45, while the dot density in the vertical direction can be changed so that it conforms to the G3 standard by changing the amount of movement of the original document 47 with the conveying unit 46. Also, when the transmission of data in the G4 standard is instructed, the dot density in both the horizontal and vertical directions can be changed in a similar manner.

Figure 5:
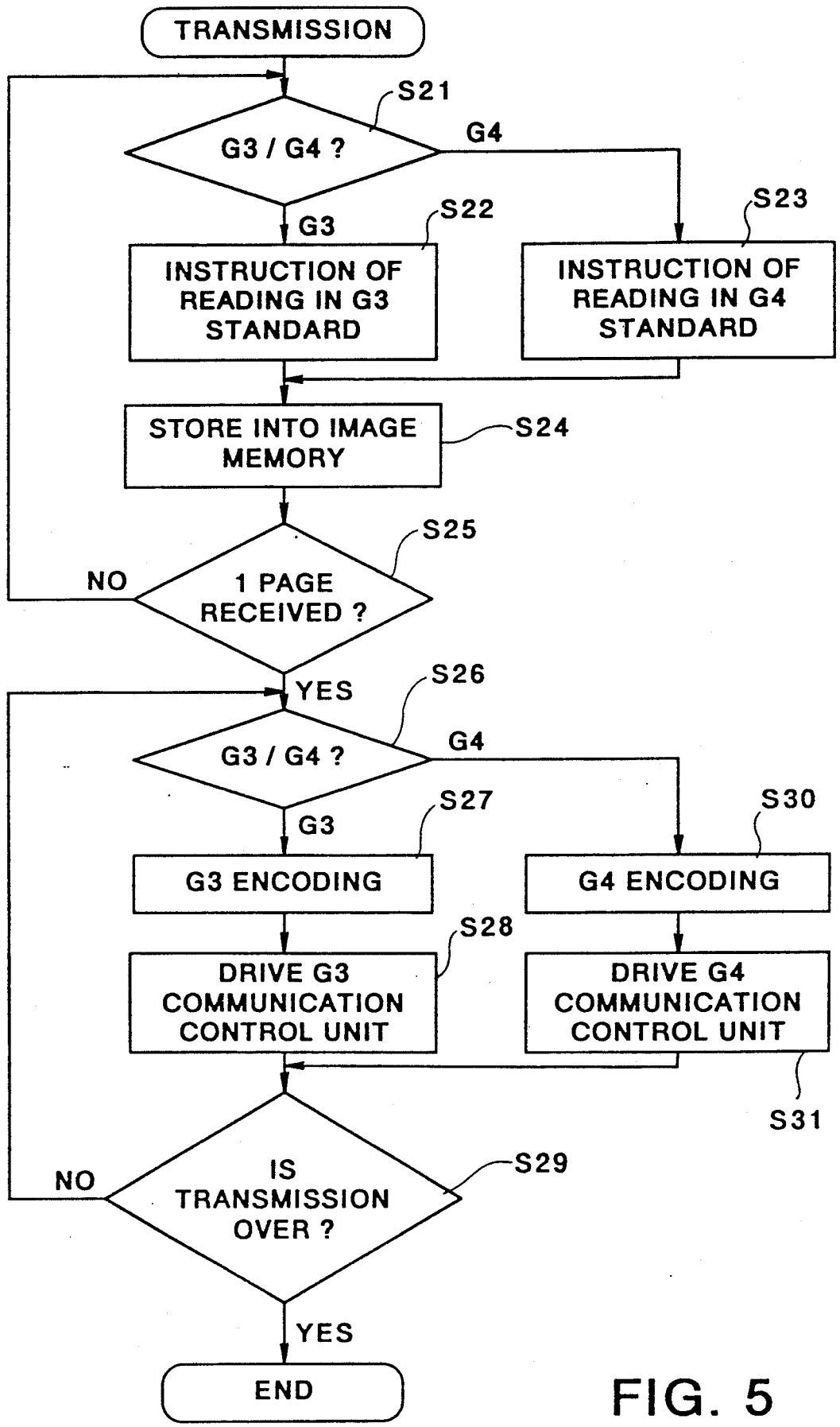
FIG. 5 is a flowchart of the transmission routine processed by the facsimile apparatus of FIG. 1.

FIG. 5 is a flowchart of the transmission processing executed by the image reading unit 7. The control program used to execute this processing is stored in the ROM 102 of the control unit 1.

The processing shown in FIG. 5 is started by the pressing of the transmission start key 48 in the control panel 13. It is first determined in step S21 whether the destination facsimile machine is a G3 or G4 machine. This may be determined from the instruction keys 49 in the control panel 13 or using the information stored in a table in correspondence with the telephone numbers of the facsimile machines of the receiving parties. Alternatively, it may be determined from the protocol used in the communication with the facsimile machine of the receiving party. If the receiving facsimile machine is a G3 machine, the control unit 1 gives the image reading unit 7 an instruction to read an original document in conformity with the G3 standard by the density control signal 5 in step S22. If the receiving facsimile machine is a G4 machine, the processing goes to step S23 in which the image reading unit 7 is instructed to read the original document in conformity with the G4 standard. Thereafter, the image data read by the image reading unit 7 is stored in the image memory 53 in step S24. Thus, the image memory 53 stores image data having a pixel density corresponding to the G3 or G4 standard.

It is then determined in step S25 whether or not one page of original document has been read. If image data corresponding to one page of original document has been stored in the image memory 53, it is determined in step S26 whether the receiving facsimile machine is a G3 or G4 machine, as in step S21. If the receiving facsimile machine is a G3 machine, coding of the image data in conformity with the G3 standard is instructed to the coding/decoding unit 4 in step S27, and transmission of the coded data to the G3 telecommunication network 10 is then instructed to the G3 communication control unit 55 in step S28. If the receiving facsimile machine is a G4 machine, coding of the image data in conformity with the G4 standard is instructed to the encoding/decoding unit 4 in step S30, and the G4 communication control unit 55 is then driven in step S31 so that the coded data can be transmitted to the G4 telecommunication network 10. The above-described sequence of processings is repeated until it is determined in step S29 that the transmission is over.

In the above explanation, transmission of image data is performed each time the image data corresponding to one page is stored. However, it may also be conducted each time the image data corresponding to one line is stored.

In this embodiment, printing out is performed by a page printer each time data corresponding to one page is prepared. However, printing may also be performed each time an amount of data that can be printed out is prepared.

In the above description, there is no reference to the number of types of recording density in G3 standard (and the number of types of recording density in G4 standard). However, an arbitrary number of recording densities can be used for printing or transmission, so long as they are controllable in the image recording unit 2 or the image reading unit 7. In that case, a desired recording density can be readily obtained by controlling the rotational speed of the polygonal mirror 25 in accordance with the desired recording density in the recording density converter 2a, whereas a desired reading pixel density can be selected using the frequency converting circuit 45 and the conveying unit 46 in the image reading unit 7, as in the above-described case. Furthermore, deterioration in the quality of image to be transmitted or received does not occur.

As will be seen from the foregoing description, in the present embodiment, the image signal received from a telecommunication network can also be recorded in the image recording unit at a pixel density different from its original pixel density without requiring reduction or enlargement process of the image data received and without deterioration of the quality of the received image.

Furthermore, in the present embodiment, it is possible to transmit image data at a pixel density which matches the recording pixel density of a receiving facsimile machine. Consequently, even when the pixel density of the image reading unit of a transmitting facsimile machine differs from the recording pixel density of a receiving facsimile machine, the image data can be transmitted without deterioration of the quality of the image.

Next, a second embodiment of the present invention will be described with reference to FIGS. 6 to 9. In this embodiment, the image reader 50 and the image recorder 60 respectively read and print image data at a fixed pixel density, as in the case of the conventional facsimile apparatus shown in FIG. 10, and the options of executing or not executing conversion of the pixel density of the image data received or to be transmitted can be selected depending on whether or not maintenance of the quality of the image should be given priority over the exact duplication of the size of the original image.

Figure 6:
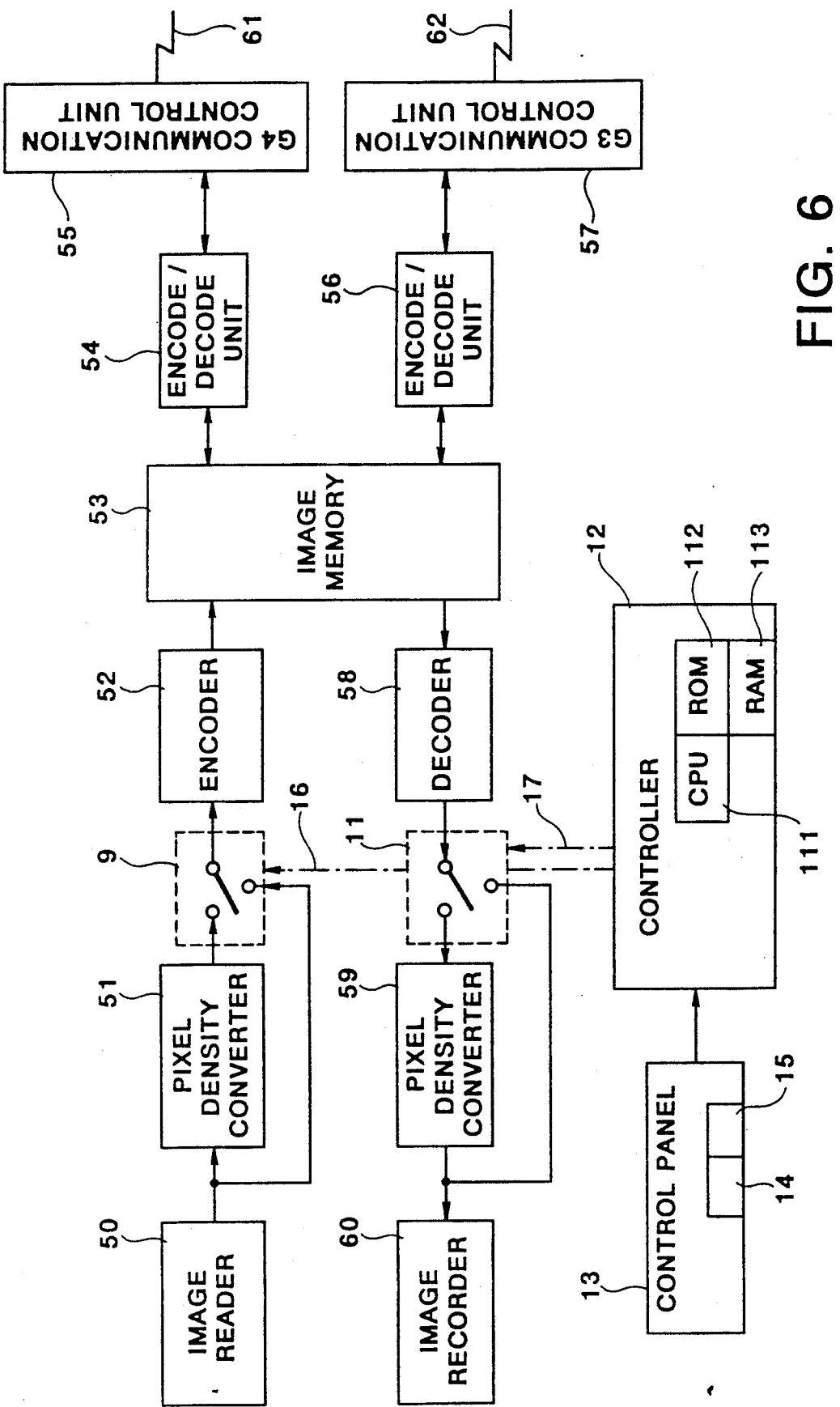
FIG. 6 is a block diagram of a facsimile apparatus, showing a second embodiment of the present invention.

FIG. 6 is a block diagram of a facsimile machine of this embodiment. In FIG. 6, the same reference numerals are used to denote parts which are the same as those in the facsimile machine shown in FIG. 1 and in the conventional facsimile machine shown in FIG. 10, and the following description will center on parts which are different from those of the conventional machine shown in FIG. 10.

Switches 9 and 11 respectively have terminals a and b. They are respectively connected to either the terminal a or b by switch-over signals 16 and 17 sent from a controller 12. The controller 12 incorporates a CPU 111 such as a microcomputer which controls the entire facsimile machine, a ROM 112 for storing the control programs for the CPU 111 and various types of data, and a RAM 113 used as the work area for the CPU 111. An instruction of switch-over of the switches 9 and 11 is given to the controller 12 by an operator from a control panel 13. The control panel 13 has alternate keys 14 and 15. Switch-on of the alternate key 14 causes the switch 9 to be connected to the terminal a, whereas switch-off of the alternate key 14 causes the switch 9 to be connected to the terminal b. Similarly, switch-on of the alternate key 15 causes the switch 11 to be connected to the terminal a, while the switch-off of the key 15 causes the switch 11 to be connected to the terminal b.

Figure 7:
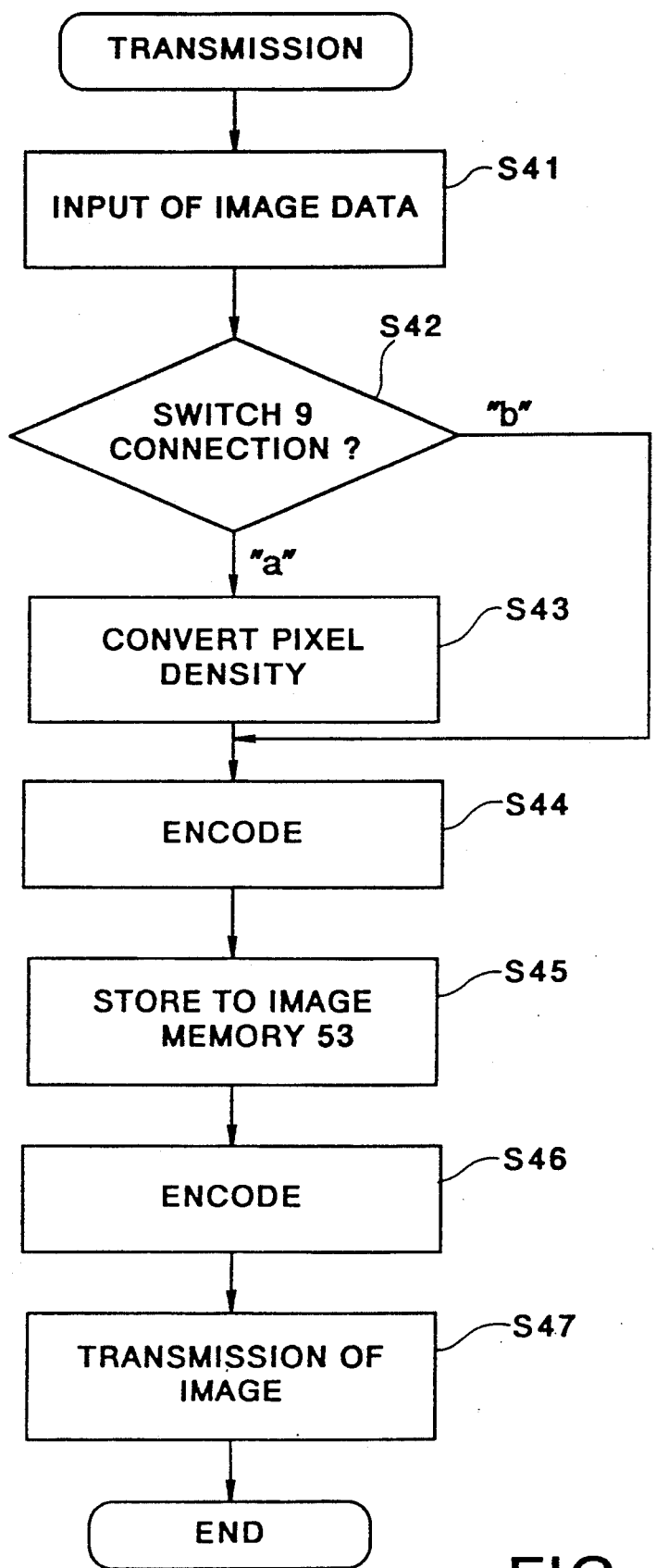
FIG. 7 is a flowchart of the transmission routine processed by the facsimile apparatus of FIG. 6.
Figure 8:
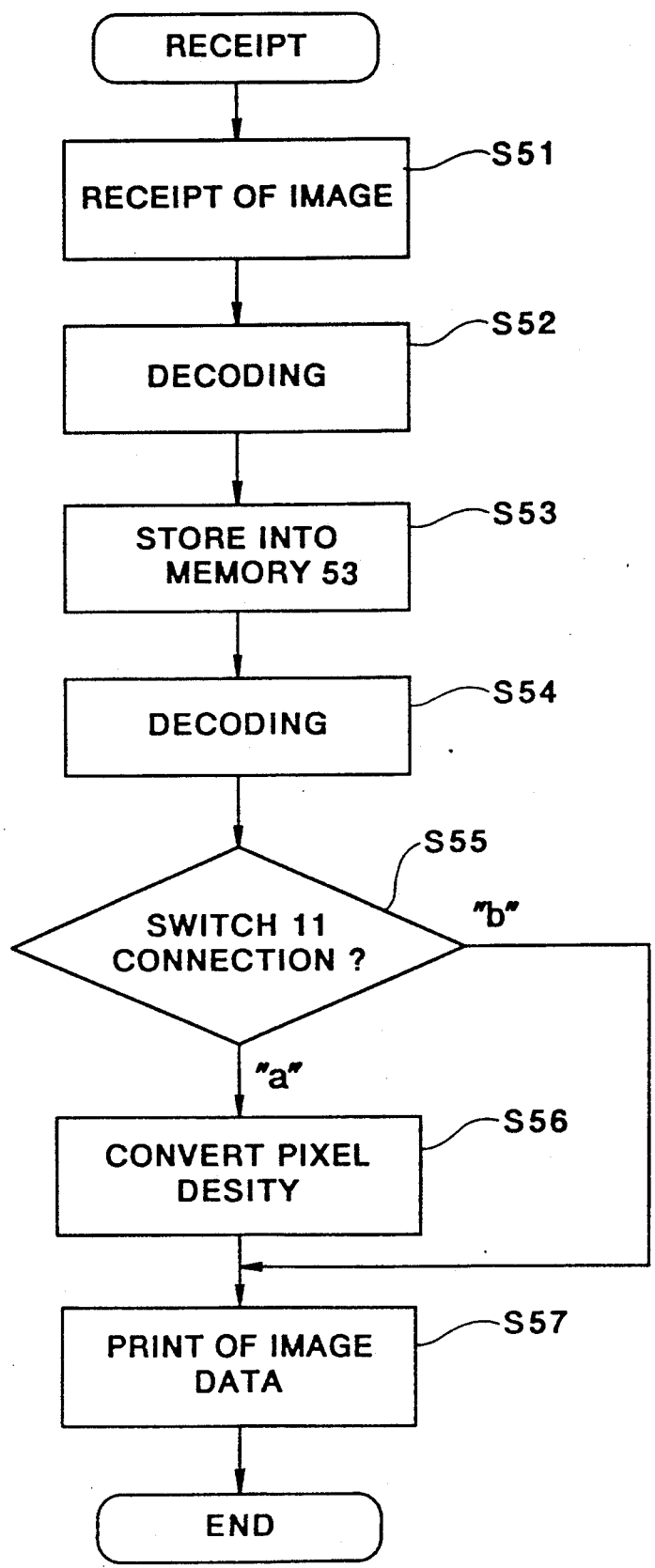
FIG. 8 is a flowchart of the receipt routine processed by the facsimile apparatus of FIG. 6.

FIG. 7 is a flowchart of the transmission processing performed in the facsimile machine shown in FIG. 6, and FIG. 8 is a flowchart of the receipt processing performed in the same facsimile machine.

In the transmission routine shown in FIG. 7, an original document to be transmitted is read by the image reader 50 first in step S41. Next, it is determined in step S43 whether or not the switch 9 is connected to the terminal a. If the switch 9 has been connected to the terminal a, the pixel density of the image data read is converted by the pixel density converter 51 in step S43, and the resultant image data is then encoded by the encoder 52 in step S44. If the switch 9 has been connected to the terminal b, the processing directly goes to step S44 in which encoding of the image data read is performed. Thereafter, the encoded data is stored in the image memory 53 in step S45.

Next, MH or MMR coding of the image data is performed in step S46. MH coding is conducted in the G3 transmission mode, while MMR coding is performed in the G4 transmission mode. Thereafter, in step S47, the coded image data is transmitted on the communication line by the corresponding communication control unit (55 or 57).

In the receipt routine shown in FIG. 8, G3 or G4 image data is received first in step S51. Next, in step S52, the received image data is decoded by the corresponding encode/decode unit (54 or 56), and the decoded image data is then stored in the image memory 53 in step S53. In step S54, the image data read from the image memory 53 is decoded (expanded), and if it is then determined in step S55 that the switch 11 is connected to the terminal a, the pixel density of the image data is converted by the pixel density converter 59 in step S56. Thereafter, the image data whose pixel density has been converted is reproduced by the image recorder 60 to form an image in step S57. On the other hand, if the switch 11 is connected to the terminal b, the processing goes from step S55 to step S57, and the encoded image data is used to form an image, without conversion of the pixel density, by the image recorder 60, which may be a thermal printer or a laser beam printer.

Figure 9:
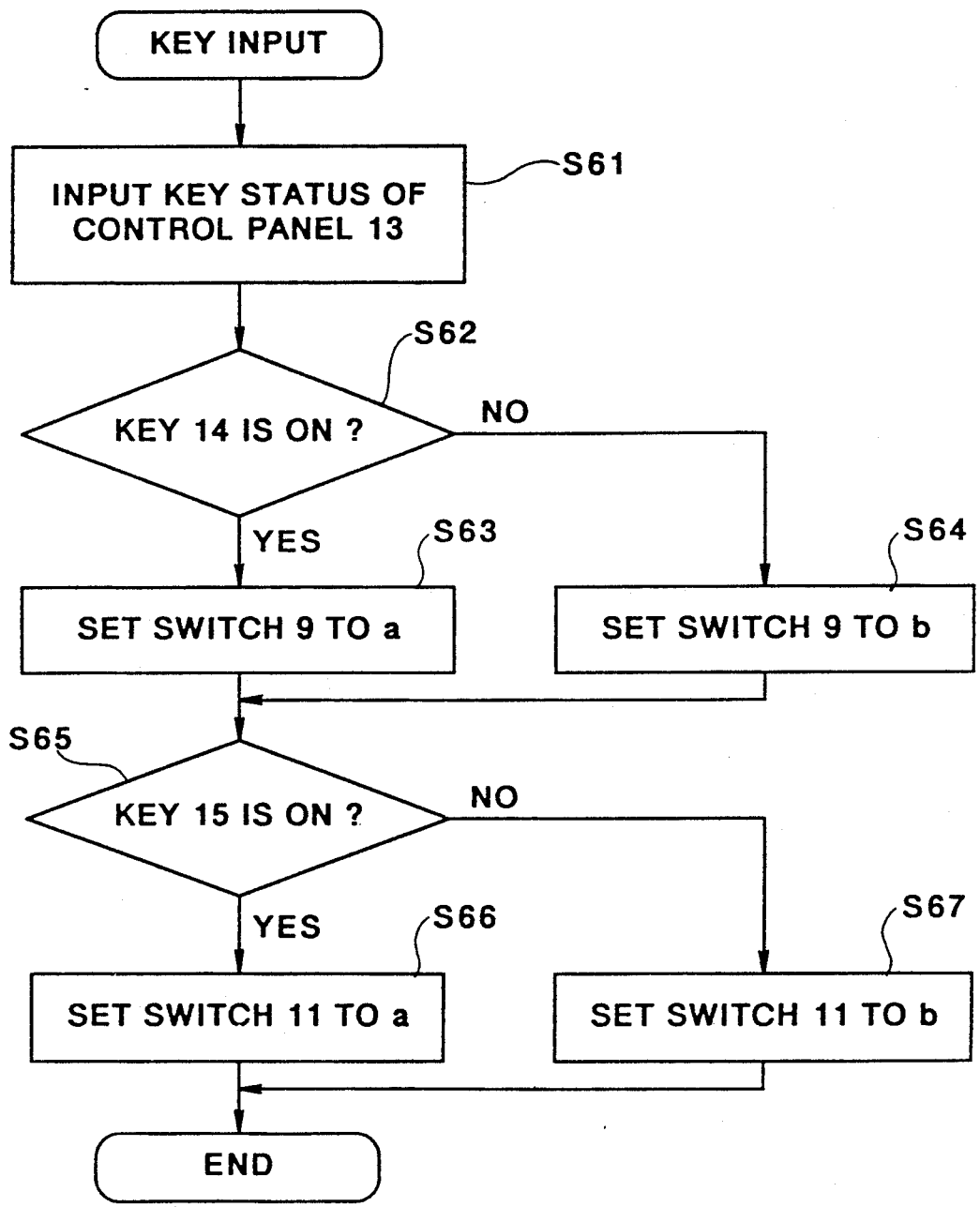
FIG. 9 is a flowchart of the key input routine processed by a control unit of the facsimile apparatus of FIG. 6.

FIG. 9 is a flowchart of the processing of the key input from the control panel 13 which is performed in the controller 12 of the facsimile machine of the second embodiment. This control program is stored in the ROM 112 of the controller 12.

In step S61, a key signal from the control panel 13 is input. Next, it is determined in step S62 whether or not the key 14 is on. If the key 14 is on, the switch-over signal 16 is output in step S63 to connect the switch 9 to the terminal a. On the other hand, if the key 14 is off, the switch 9 is connected to the terminal b by the switch-over signal 16 in step S64.

Similarly, it is determined in step S65 whether or not the switch 15 is on. If the key 15 is on, the switch 11 is connected to the terminal a by the switch-over signal 17 in step S66. On the other hand, if the key 15 is off, the switch 11 is connected to the terminal b in step S67. The pixel density of the image signal read by the image reader 50 is converted when the key 14 is on, and the pixel density of the image signal received is converted when the key 15 is on.

An example of conversion of the pixel density, which is performed in the pixel density converter 51 and 59, will be described below. In a case where the image reader 50 reads an original document at a pixel density of $8 \times 7.7$ pixels/mm$^2$ and where the image data read by the image reader 50 is transmitted in the G4 transmission mode, if an operator presses the key 14 of the control panel 13, the pixel density converter 51 makes the pixel density of the image reader 50 equivalent to the G4 pixel density of $200 \times 200$ pixels/inch$^2$ by interpolating one pixel for every 63 pixels in the horizontal direction and by deleting one pixel row for every 45 pixel rows in the vertical direction.

In a case where the image data received in the G3 standard mode is to be printed out by the image recording unit 60 at a recording density of 200×200 pixels/inch², if the switch 15 is pressed, the pixel density converter 59 performs conversion of the pixel density. In this conversion, one pixel is deleted for every 64 pixels in the horizontal direction of the image data, and one row of the same pixel as the pixel in the previous row is added for every 45 pixels in the vertical direction. This allows an image having the same size as that of the document received to be formed by the image recording unit.

In either of the pixel density conversions described above, since non-uniform deletion and addition of the pixels are performed, the quality of the image deteriorates, even though the image size is duplicated exactly. Therefore, if it is not desired to execute such a pixel density conversion, execution of the pixel density conversion can be eliminated by switching off both the keys 14 and 15, or either key 14 or key 15. Conversely, if it is desired to make the size of the two documents exact duplicates, execution of the pixel density conversion can be selected by switching on both the keys 14 and 15 or either the key 14 or 15.

Figure 12:
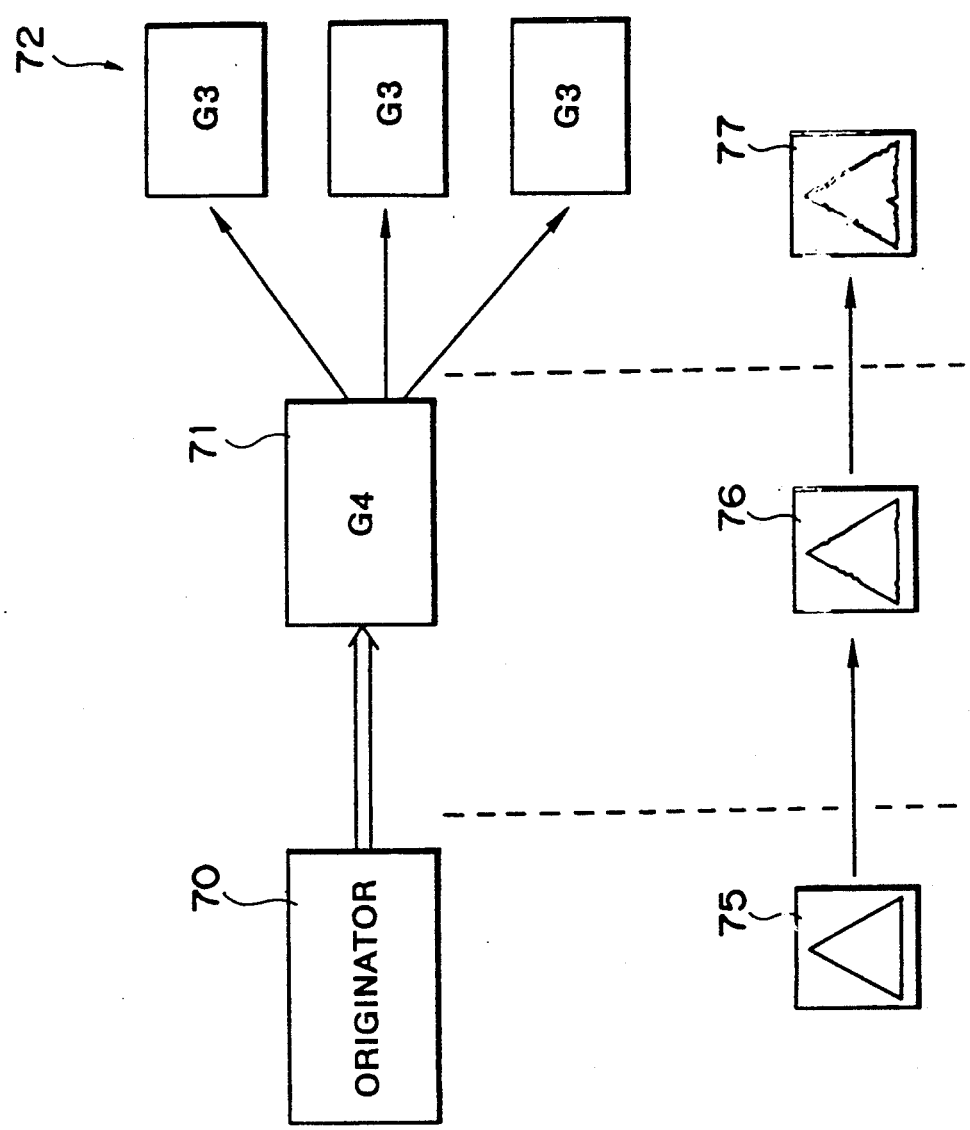
FIG. 12 illustrates the deterioration in the quality of an image caused in the relayed facsimile image data due to the conversions of the pixel density performed in the individual facsimile machines.

FIG. 12 illustrates a case in which a document is transmitted from a G3 original machine 70 to G3 facsimile machines 73 via a G4 facsimile machine 71 which serves as a relaying station. In such a case, if pixel density conversion is executed between the facsimile machines 70 and 71 and between the facsimile machines 71 and 72, the quality of the image transmitted is degraded, as illustrated by documents 75 to 77. In the above-described case, since the pixel density of the originator 70 is the same as that of the facsimile machine 72, the keys 14 and 15 in the control panel 13 in the facsimile machines 70 to 72 are switched off so that no conversion of the pixel density is executed. In this way, image data in which the quality of the image is not degraded can be transmitted.

Also, when detailed documents such as photos or information are to be transmitted, both the keys 14 and 15 are switched off so that no conversion of pixel density is executed during the transmission so as to enable detailed information to be accurately transmitted.

As will be understood from the foregoing description, in the present embodiment, it is possible to transmit or receive image data without deterioration of the quality thereof by selecting whether or not conversion of the pixel density is performed on the image received or transmitted. Thus, the options of executing or not executing conversion of the pixel density can be selected depending on whether maintenance of the quality of the image should be given priority, like the transmission of a photographic document, or whether maintenance of the size of the image should be given priority over maintenance of the quality of the image.

Furthermore, in this embodiment, simply constructed switches and operating keys are used to instruct conversion of the pixel density. Consequently, the second embodiment can be realized at a lower production cost than that of the first embodiment in which a printer of the image recording unit and the image reading unit are respectively provided with a pixel conversion function.

As many apparently widely different embodiments of the present invention can be made without departing from the spirit and scope thereof, it is to be understood that the invention is not limited to the specific embodiments thereof except as defined in the appended claims.

What is claimed is:

1. A facsimile apparatus which is capable of transmitting data in at least two selected communication standard modes, comprising:
   instruction means for providing instructions as to the communication standard of the receiving facsimile apparatus;
   image reading means in which the pixel density with which an original document is read can be modified;
   control means for controlling said image reading means to modify the pixel density in accordance with the instruction from said instruction means;
   encoding means for encoding an image signal from said image reading means in accordance with the instruction from said instruction means; and
   transmission means for transmitting the encoded image signal in conformity with the communication standard of said receiving facsimile apparatus.

2. A facsimile apparatus according to claim 1, wherein said image reading means includes a photoelectric conversion means for reading an original image document, frequency converting means for converting the frequency of a synchronizing clock signal of said photoelectric conversion means, and image conveying means for conveying said original image document over an alterable distance be conveyed.

3. A facsimile apparatus which is capable of transmitting and receiving data in at least two selected communication standard modes, comprising:
   receiving means provided to conform to the communication receive standards;
   determination means for determining the communication standard of the image signal received by said receiving means;
   decoding means for decoding said image signal received in accordance with the results of determination made by said determination means;
   recording means capable of recording the decoded image data at a modified recording density;
   recording density converting means for converting the recording density of said recording means in accordance with the results of determination made by said determination means;
   instruction means for providing instructions as to the communication standard of a receiving facsimile apparatus;
   image reading means in which the pixel density with which an original document is read can be modified;
   control means for controlling said image reading means to modify the pixel density in accordance with the instruction from said instruction means;
   encoding means for encoding an image signal from said image reading means in accordance with the instruction from said instruction means; and
   transmission means for transmitting the encoded image signal in conformity with the communication standard of said receiving facsimile apparatus.

4. A facsimile apparatus according to claim 3, wherein said recording means is a printing device that employs an electrophotographic recording process, and wherein said recording density is modified by changing the speed at which light scans a photosensitive body.

5. A facsimile apparatus according to claim 3, wherein said image reading means includes photoelectric conversion means for reading an original image document, frequency converting means for converting the frequency of a synchronizing clock signal of said photoelectric conversion means, and image conveying means for conveying said original image document over an alterable distance.

6. A facsimile apparatus which is capable of transmitting data selectively in either of the G3 or G4 communication standard modes, comprising:
   instruction means for providing instructions as to whether a receiving facsimile apparatus is a G3 or G4 machine;
   image reading means in which the pixel density with which an original document is read can be modified;
   control means for controlling said image reading means to modify the pixel density in accordance with the instruction from said instruction means;
   encoding means for encoding an image signal from said image reading means in accordance with the instruction from said instruction means; and
   transmission means for transmitting the encoded image signal in conformity with the communication standard of said receiving facsimile apparatus.

7. A facsimile apparatus which is capable of transmitting and receiving data selectively in either of the G3 or G4 communication standard modes, comprising:
   receiving means provided to correspond with both the G3 and G4 communication standards;
   determination means for determining whether the image signal received by said receiving means conforms to the G3 or G4 communication standard;
   decoding means for decoding said image signal received in accordance with the results of determination made by said determination means;
   recording means capable of recording the decoded image data at a modified recording density conforming to either the G3 or G4 standard;
   recording density converting means for converting the recording density of said recording means in accordance with the results of determination made by said determination means;
   instruction means for providing instructions as to whether a receiving facsimile apparatus is a G3 or G4 machine;
   image reading means in which the pixel density with which an original document is read can be modified;
   control means for controlling said image reading means to modify the pixel density in accordance with the instruction from said instruction means;
   encoding means for encoding an image signal from said image reading means in accordance with the instruction from said instruction means; and
   transmission means for transmitting the encoded image signal in conformity with the communication standard of said receiving facsimile apparatus.

8. A facsimile apparatus in which the pixel density of image data received or to be transmitted can be converted when the image received or to be transmitted is to be formed, comprising:
   reading means for photoelectrically reading a document image at a fixed pixel density;
   conversion means for converting the pixel density of the image data from said reading means;
   manual instruction means for instructing said conversion means to execute or not to execute conversion of the pixel density; and
   transmission means for encoding and transmitting the image data whose pixel density has been converted by said conversion means, in a case where said instruction means instructs said conversion means to execute conversion of the pixel density, and for transmitting the image data whose pixel density has not been converted, in a case where said instruction means has not instructed conversion.

9. A facsimile apparatus capable of receiving an image signal in conformity with both a first and a second communication standard, comprising:
   receiving means for receiving a facsimile image signal;
   decoding means for decoding the image signal received by said receiving means and thereby converting it into received image data;
   recording means for recording the received image data at a fixed pixel density conforming to either the first or the second communication standard;
   converting means for converting the pixel density of the received image data so that it conforms to the fixed pixel density of said recording means; and
   manual selection means for selecting to execute or not to execute conversion of the pixel density of the received image data by said converting means when the fixed pixel density of said recording means does not conform to the pixel density of the received image data,
   wherein if said manual selection means selects to execute conversion of the pixel density, the pixel density of the received image data is converted to conform to the fixed pixel density of said recording means, and if said manual selection means does not select to execute conversion of the pixel density of the received image data, said recording means records the received image data without conversion of the pixel density of the received image data.

10. A facsimile apparatus capable of transmitting and receiving in conformity with both a first and a second communication standard, comprising:
   reading means for photoelectrically reading a document image at a first fixed pixel density conforming to either the first or the second communication standard;
   first converting means for converting the first fixed pixel density of the image data from said reading means;
   transmission means for encoding and transmitting the image data whose pixel density has been converted by said first converting means or the image data whose pixel density has not been converted;
   receiving means for receiving a facsimile image signal;
   decoding means for decoding the image signal received by said receiving means and thereby converting it into received image data;
   recording means for recording the received image data at a second fixed pixel density conforming to either the first or the second communication standard;
   second converting means for converting the pixel density of the received image data so that it conforms to the second fixed pixel density of said recording means; and
   manual selection means for selecting to execute or not to execute conversion of the pixel density of the image data by said first converting means or said second converting means when the first fixed pixel density of said reading means does not conform to the pixel density of a transmitting facsimile apparatus, or the second fixed pixel density of said recording means does not conform to the pixel density of the received image data;

wherein if said manual selection means selects to execute conversion of the pixel density, the pixel density of the received image data is converted to conform to the fixed pixel density of said recording means, and if said manual selection means does not select to execute conversion of the pixel density of the received image data, said recording means records the received image data without conversion of the pixel density of the received image data.

11. A facsimile apparatus which is capable of transmitting and receiving an image signal in conformity with both the G3 and G4 communication standards, comprising:

reading means for photoelectrically reading a document image at a first pixel density conforming to either the G3 or the G4 communication standard;

first converting means for converting the pixel density of the image data from said reading means to the pixel density of a communication standard which is different from the first pixel density of said reading means;

transmission means for encoding and transmitting the image data whose pixel density has been converted by said first conversion means or the image data whose pixel density has not been converted:

receiving means for receiving a facsimile image signal in conformity with either the G3 or the G4 communication standard;

decoding means for decoding the image signal received by said receiving means and thereby converting it into received image data;

recording means for recording the received image data at a second fixed pixel density in conformity with either the G3 or the G4 communication standard;

second converting means for converting the pixel density of the received image data so that it conforms to the second pixel density of said recording means; and manual selection means for manually selecting and instructing both of said first and second converting means either to execute or not to execute conversion of the pixel density when the first fixed pixel density of said reading means does not conform to the pixel density of a current communication standard, or the second fixed pixel density of said recording means does not conform to the pixel density of the received image data, wherein if said manual selection means selects to execute conversion of the pixel density, the pixel density of the received image data is converted to conform to the fixed pixel density of said recording means, and if said manual selection means does not select to execute conversion of the pixel density of the received image data said recording means records the received image data without conversion of the pixel density of the received image data.

12. A facsimile apparatus according to claim 10, wherein said first fixed pixel density and said second fixed pixel density are equal.

13. A facsimile apparatus according to claim 11, wherein said first fixed pixel density and said second fixed pixel density are equal.

* * * * *

UNITED STATES PATENT AND TRADEMARK OFFICE
CERTIFICATE OF CORRECTION

PATENT NO. : 5,041,915

DATED : August 20, 1991

INVENTOR(S) : YUKO HIROTA, ET AL.

It is certified that error appears in the above-identified patent and that said Letters Patent is hereby corrected as shown below:

In the Drawings:

SHEET 9 OF 13

FIG. 8, "DESITY" should read --DENSITY--.

COLUMN 1

Line 51, "machine" should read --machines--.

COLUMN 2

Line 48, "verter" should read --verters--.

COLUMN 4

Line 68, "process" should read --processed--.

COLUMN 5

Line 40, "signal," should read --signals,--.
   Line 65, "G3 or G4, mode" should read --the G3 or the G4 mode,--. before "be" insert --to--;

COLUMN 6

Line 28, "signals 8" should read --signal 8--.

COLUMN 7

Line 22, "is" should be deleted.
   Line 33, "printer" should read --printers--.

COLUMN 9

Line 7, "the" should be deleted.

UNITED STATES PATENT AND TRADEMARK OFFICE
CERTIFICATE OF CORRECTION

PATENT NO. : 5,041,915
DATED : August 20, 1991
INVENTOR(S) : YUKO HIROTA, ET AL.

It is certified that error appears in the above-identified patent and that said Letters Patent is hereby corrected as shown below:

COLUMN 10

Line 9, "keys 49" should read --key 49--.
Line 37, "network 10" should read --network 20--.
Line 38, "unit 55" should read --unit 57--.

COLUMN 12

Line 57, "converter" should read --converters--.

COLUMN 13

Line 27, "machines 73" should read --machine 72--.

COLUMN 14

Line 27, "be conveyed." should read --.--.

Signed and Sealed this

Twenty-fifth Day of May, 1993

Attest:

MICHAEL K. KIRK

Attesting Officer     Acting Commissioner of Patents and Trademarks